US006401200B1

(12) United States Patent
Nishiike et al.

(10) Patent No.: US 6,401,200 B1
(45) Date of Patent: *Jun. 4, 2002

(54) DEVICE FOR SIMULTANEOUSLY DOWNLOADING CODE INTO PLURAL DSP MEMORIES FROM SINGLE MASTER MEMORY

(75) Inventors: Rika Nishiike; Hiroshi Katayama; Chiharu Kawai, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,437

(22) Filed: Mar. 19, 1998

(30) Foreign Application Priority Data

Oct. 16, 1997 (JP) ............................................. 9-284024

(51) Int. Cl.⁷ ............................................ G06F 15/177
(52) U.S. Cl. ......................................................... 713/2
(58) Field of Search ........................ 713/1, 2; 712/225, 712/35; 709/208, 211, 216

(56) References Cited

U.S. PATENT DOCUMENTS

| 4,368,514 A | * | 1/1983 | Persaud et al. | ............. 709/211 |
| 4,459,655 A | * | 7/1984 | Willemin | ........................ 700/3 |
| 5,117,430 A | * | 5/1992 | Bergland | .................... 370/408 |
| 5,187,794 A | * | 2/1993 | Hall | .............................. 713/1 |
| 5,329,579 A | * | 7/1994 | Brunson | ................... 379/88.26 |
| 5,349,673 A | * | 9/1994 | Yasuda | ........................ 709/211 |
| 5,555,548 A | * | 9/1996 | Iwai et al. | ................... 709/208 |

FOREIGN PATENT DOCUMENTS

| JP | 57-45647 | 3/1982 |
| JP | 62-160538 | 7/1987 |
| JP | 62-211750 | 9/1987 |
| JP | 3-144738 | 6/1991 |
| JP | 5-250258 | 9/1993 |

OTHER PUBLICATIONS

IBM Technical Disclosure Bulletin, *Multiprocessor Initialization and Verification Method*, vol. 33, No. 8, Jan. 1991.*
IBM Technical Disclosure Bulletin, *Apparatus to Download and Verify Microcode onto Multiple Processors*, vol. 36, No. 12, Dec. 1983.*
IBM Technical Disclosure Bulletin, *Multi–Task Approach to Downloading Microcode Modules*, vol. 37, No. 5, May 1994.*
IBM Technical Disclosure Bulletin, *Enhanced Download of IBM 8230s with Minimum Disruption to the Users*, vol. 38, No. 7, Jul. 1995.*

* cited by examiner

Primary Examiner—Richard L. Ellis
(74) Attorney, Agent, or Firm—Katten Muchin Zavis Rosenman

(57) ABSTRACT

A device includes a plurality of DSPs, instruction memories respectively provided to the DSPs, a master memory storing download information which is to be written into the instruction memories, and an address generator generating addresses of the instruction memories and the master memories.

12 Claims, 17 Drawing Sheets

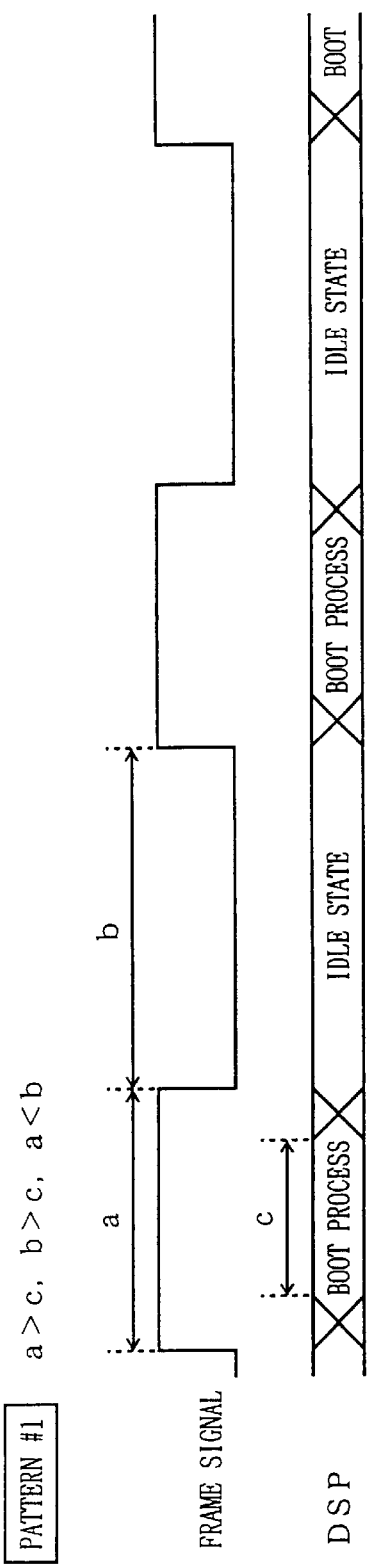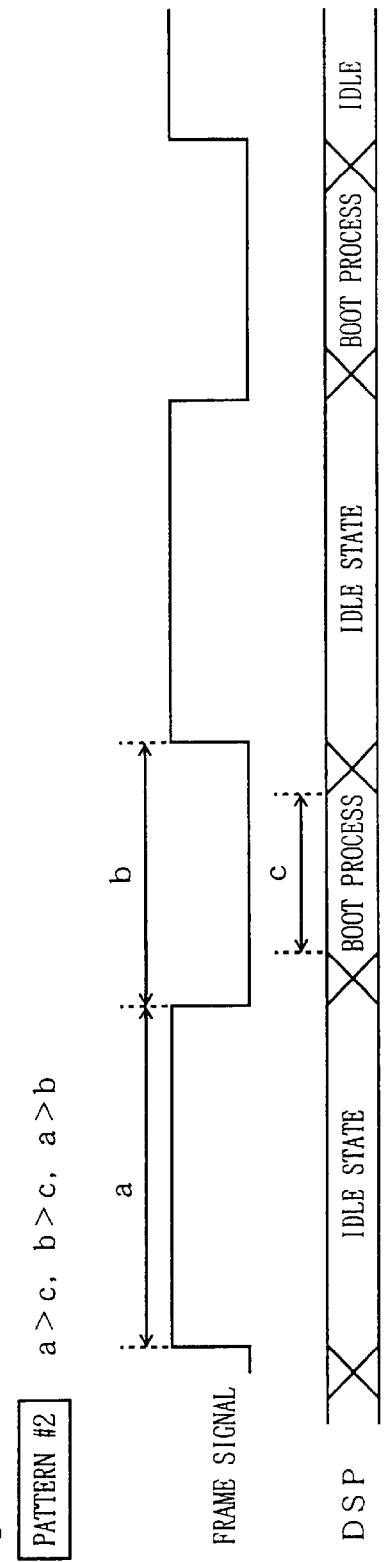

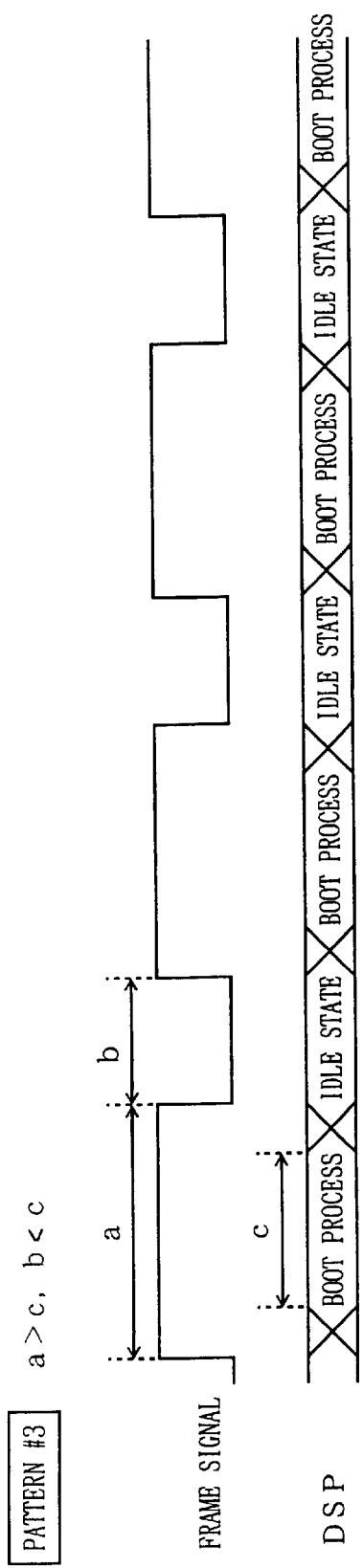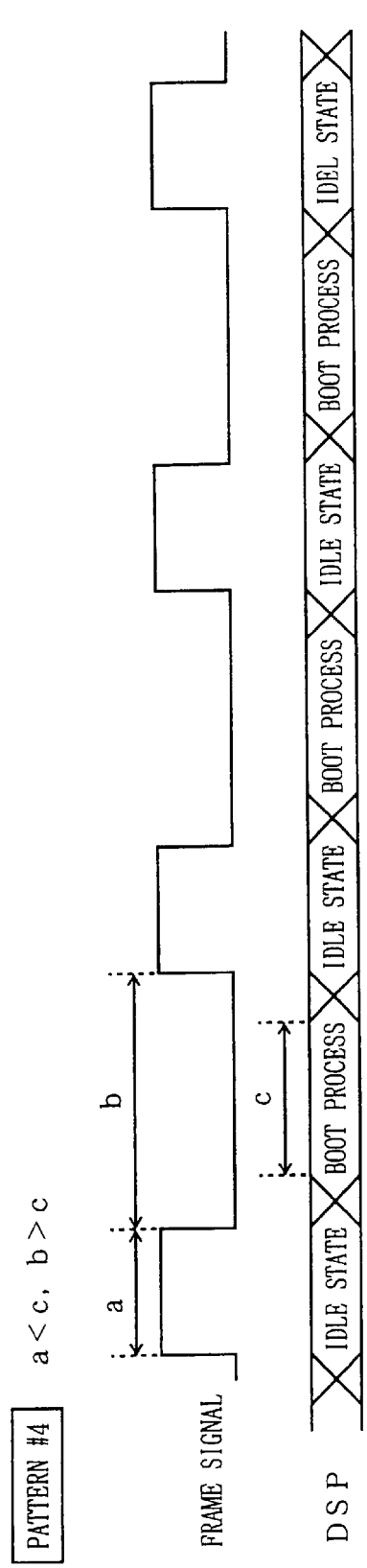

DEVICE FOR SIMULTANEOUSLY DOWNLOADING CODE INTO PLURAL DSP MEMORIES FROM SINGLE MASTER MEMORY

BACKGROUND OF THE INVENTION

1. Field of the Invention

The present invention generally relates to a digital signal processor (DSP), and more particularly to a boot (download) process in a device having a plurality of DSPs. Further, the present invention is concerned with a switch system having the function of encoding and decoding voice by using DSPs.

The DSP is capable of processing a large amount of data efficiently and is thus applied to various electronic devices. For example, the DSP is used, in the mobile telecommunications, to form a codec (coder and decoder) for voice encoding and decoding in switch systems.

2. Description of the Related Art

FIG. 1 is a block diagram of a mobile telecommunication system, which includes a plurality of switch stations, radio stations, portable terminals and telephone terminals. Each of the switch systems is equipped with a codec processing part which encodes and decodes voice signals.

The switch stations are connected to a large number of terminals and radio stations. Thus, the codec processing part in each switch station is required to have a sufficient number of channels and perform the voice encoding and decoding at a high speed. Generally, the codec processing part is made up of a plurality of DSPs equal in number to the channels. A boot type (download type) DSPs are mainly used in order to cope with a fault in a codec process algorithm and upgrading thereof.

FIG. 2 shows a structure of the codec processing part. The codec processing part includes a plurality of units equal in number of channels, and the respective units include master ROMs 101, 102 and 103, and DSPs 111, 112 and 113. The DSPs 11, 112 and 113 are connected to peripheral circuits 121, 122 and 123, respectively. When a call request occurs in a channel (it will now be assumed that the peripheral circuit 121 receives such a request), the peripheral circuit 121 sends a boot (download) permission signal to the DSP 111. Upon receipt of the boot permission signal, the DSP 111 sends an address (boot address) to the master ROM 101. Then, data stored in a memory area of the master ROM 101 specified by the address is read and supplied (downloaded) to the DSP 111. When the data is completely downloaded to the DSP 111, the DSP sends a boot complete signal to the peripheral circuit 121. Then, the peripheral circuit 121 makes a connection of the call, and the DSP 111 starts the codec process. When there is no call request, the boot process is not executed.

Nowadays, the number of mobile terminals is increased and the number of switch stations is thus increased. Further, in terms of efficient use of communication channels, it is frequently required to modify the codec process algorithm such as upgrading thereof and provide various maintenance services for coping with faults or the like. As described previously, the codec processing part has the units equal in number to the channels, and in other words has master ROMs and DSPs equal in number to the channels. Hence, it is required to independently handle the master ROMs equal in number to the channels in order to modify the programs of the algorithm stored therein. The above word is troublesome.

Generally, the user requests the codec processing part to continue to stably operate during tens years. After the switch station is shipped to and installed in the user, it is very difficult to do a repair work of the codec processing part. Further, during the repair work, the terminal users cannot use the portable terminals. Hence, it is desirable that the codec processing part continues to stably operate semipermanently. However, in practice, a fault occurs in the codec processing part. For example, there a comparatively high possibility that the contents of memories such as master ROMs may be damaged due to an unexpected variation in the power supply. Hence, it is the important issue to cope with damage to the memories. However, if means for coping with damage to the memories is excessively provided, it may take a very long time to receive a call and make a connection for the call. This will be inconvenient to the terminal users. That is, it is very important to cope with damage while the users can be kept comfortable. Further, even if this is realized, it is necessary to avoid an excessive increase in the amount of power consumed.

SUMMARY OF THE INVENTION

It is an object of the present invention to provide a device having a plurality of DSPs in which the above disadvantages are eliminated.

A more specific object of the present invention is to provide a device equipped with a plurality of DSPs which is substantially immune to damage to memories.

A further object of the present invention is to provide a device equipped with a plurality of DSPs which can consume a reduced power and avoid degradation of services to users.

The above objects of the present invention are achieved by a device comprising: a plurality of DSPs; instruction memories respectively provided to the DSPs; a master memory storing download information which is to be written into the instruction memories; and an address generator generating addresses of the instruction memories and the master memories.

The above device may be configured so that the DSPs which are in an idle state periodically receive the download information from the corresponding instruction memories.

The device may be configured so that one of the DSPs which are in an idle state receives the download information from a corresponding one of the instruction memories at one time so that the DSPs which are in the idle state sequentially receive the download information at respective different timings.

The device may be configured so that, when a process request occurs, one of the DSPs which has most recently received the download information accepts the process request.

The device may be configured so that each of the DSPs receives the download information from a respective one of the instruction memories in accordance with a state of a given signal externally supplied to the device.

The device may be configured so that: when a first DSP which is one of the DSPs is receiving the download information from a first corresponding one of the instruction memories, a second DSP which is another one of the DSPs starts to receive the download information from a second corresponding one of the instruction memories in accordance with an address value identical to that for the first DSP; and when the first DSP receives all of the download information, the second DSP continues to receive the rest of the download information from the second corresponding one of the instruction memories.

The device may be configured so that the address generator generates the addresses so that values of the addresses change circularly.

The device may be configured so that: the download information contains pieces of data respectively assigned labels; when a first DSP which is one of the DSPs is receiving the download information from a first corresponding one of the instruction memories, a second DSP which is another one of the DSPs starts to receive the download information from a second corresponding one of the instruction memories so that the second DSP receives the piece of data of the download information having the same label as that assigned to the piece of data of the download information which the first DSP receives; and when the first DSP receives all of the download information, the second DSP continues to receive the rest of pieces of data forming the download information from the second corresponding one of the instruction memories.

The device may be configured so that: the download information contains pieces of data respectively assigned labels; the DSPs which are in an idle state simultaneously start to receive the download information from the corresponding instruction memories so that the DSPs simultaneously receive pieces of data having the same label.

The device may be configured so that one of the DSPs which are receiving the download information receives a process request, the above one of the DSPs accepts the process request after all the pieces of data of the download information are received.

The device may be configured so that the DSPs perform a voice encoding and decoding process.

Another object of the present invention is to provide a switch device having a function of a voice encoding and decoding process, the switch device comprising: a plurality of DSPs; instruction memories respectively provided to the DSPs; a master memory storing download information which is to be written into the instruction memories; and an address generator generating addresses of the instruction memories and the master memories.

BRIEF DESCRIPTION OF THE DRAWINGS

Other objects, features and advantages of the present invention will become more apparent from the following detailed description when read in conjunction with the accompanying drawings, in which:

FIGS. 8A and 8B are timing charts of an operation of a fourth embodiment of the present invention;

FIGS. 9A and 9B are timing charts of another operation of the fourth embodiment of the present invention;

DESCRIPTION OF THE PREFERRED EMBODIMENTS

Figure 3:
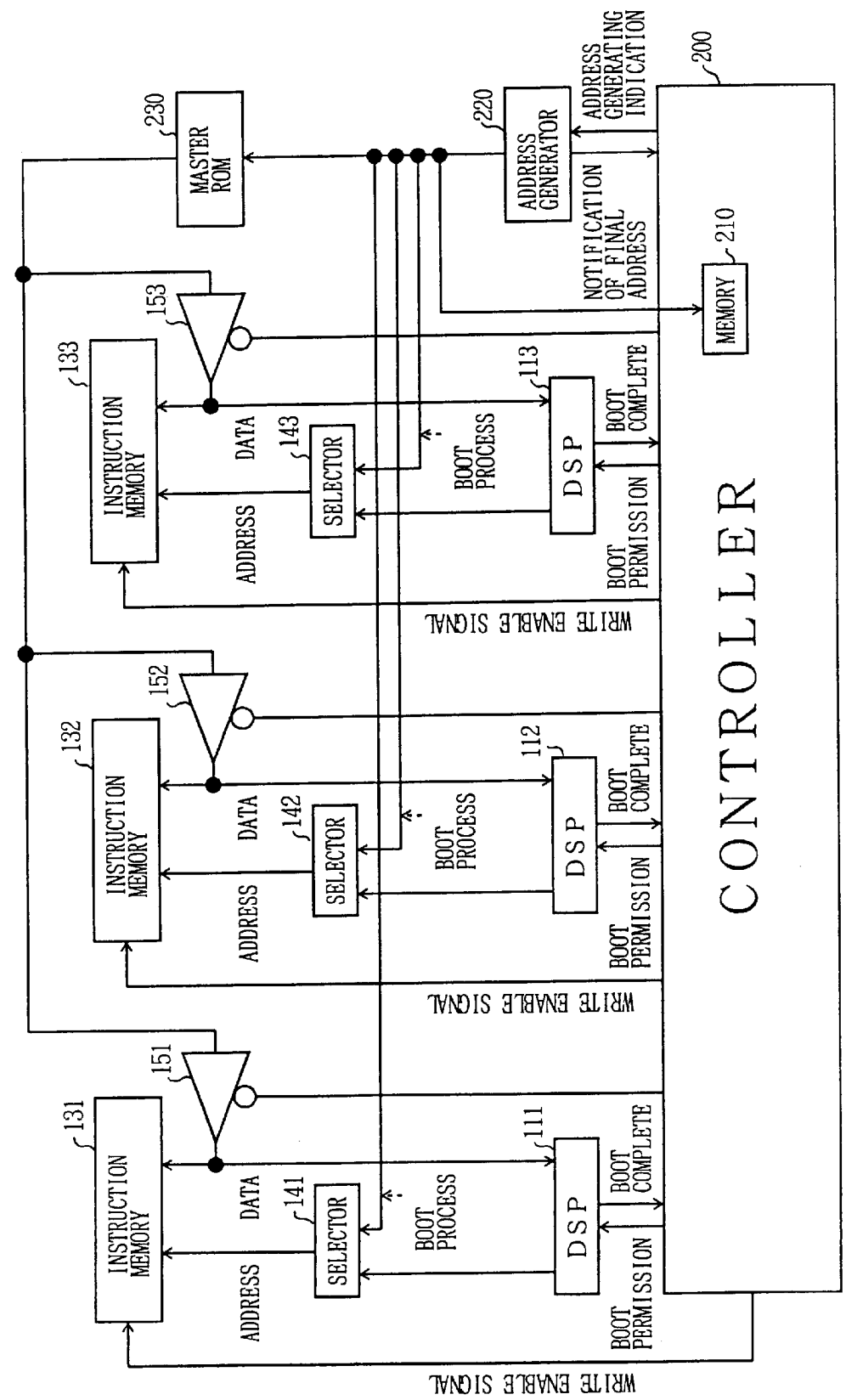
FIG. 3 is a block diagram of a structure of a first embodiment of the present invention.

FIG. 3 is a block diagram of a device according to a first embodiment of the present invention. The device shown in FIG. 3 can be provided in the codec processing part of each switch station shown in FIG. 1. The device includes a plurality of DSPs 111, 112 and 113, to which instruction memories 131, 132 and 133 are provided respectively. A single master ROM 230 is provided in common to the instruction memories 131, 132 and 133. The master ROM 230 stores download information containing programs and data necessary for the DSPs 111, 112 and 113 to operate.

An address generator 220 generates a boot address applied to the master ROM 230 and the instruction memories 131, 132 and 133. The address generated by the address generator 220 is supplied to the master ROM 230, and are supplied to the instruction memories 131, 132 and 133 via selectors 141, 142 and 143, respectively. The mask ROM 230 has the same address area as that of the address areas of the instruction memories 131, 132 and 133. When the above download information is read from the master ROM 230, it is written into the instruction memories 131, 132 and 133 via inverter gates 151, 152 and 153. At this time, the address generated by the address generator 220 is supplied to the instruction memories via selectors 141, 142 and 143.

A controller 200 sends boot permission signals to the DSPs 111, 112 and 113 and receive boot complete signals therefrom. When the controller 200 sends the boot permission signals to the DSPs 111, 112 and 113, the controller 200 controls the selectors 141, 142 and 143 to select the address generator 220. In other cases, the selectors 141, 142 and 143 select the DSPs 111, 112 and 113, respectively. At the time of the boot process, the controller 200 supplies the instruction memories 131, 132 and 133 with write enable signals. Further, the controller 200 enables the inverter gates 151, 152 and 153 at the time of booting. The controller 200 includes a built-in memory 210, which stores data indicating of call connection states of the channels.

Figure 1:
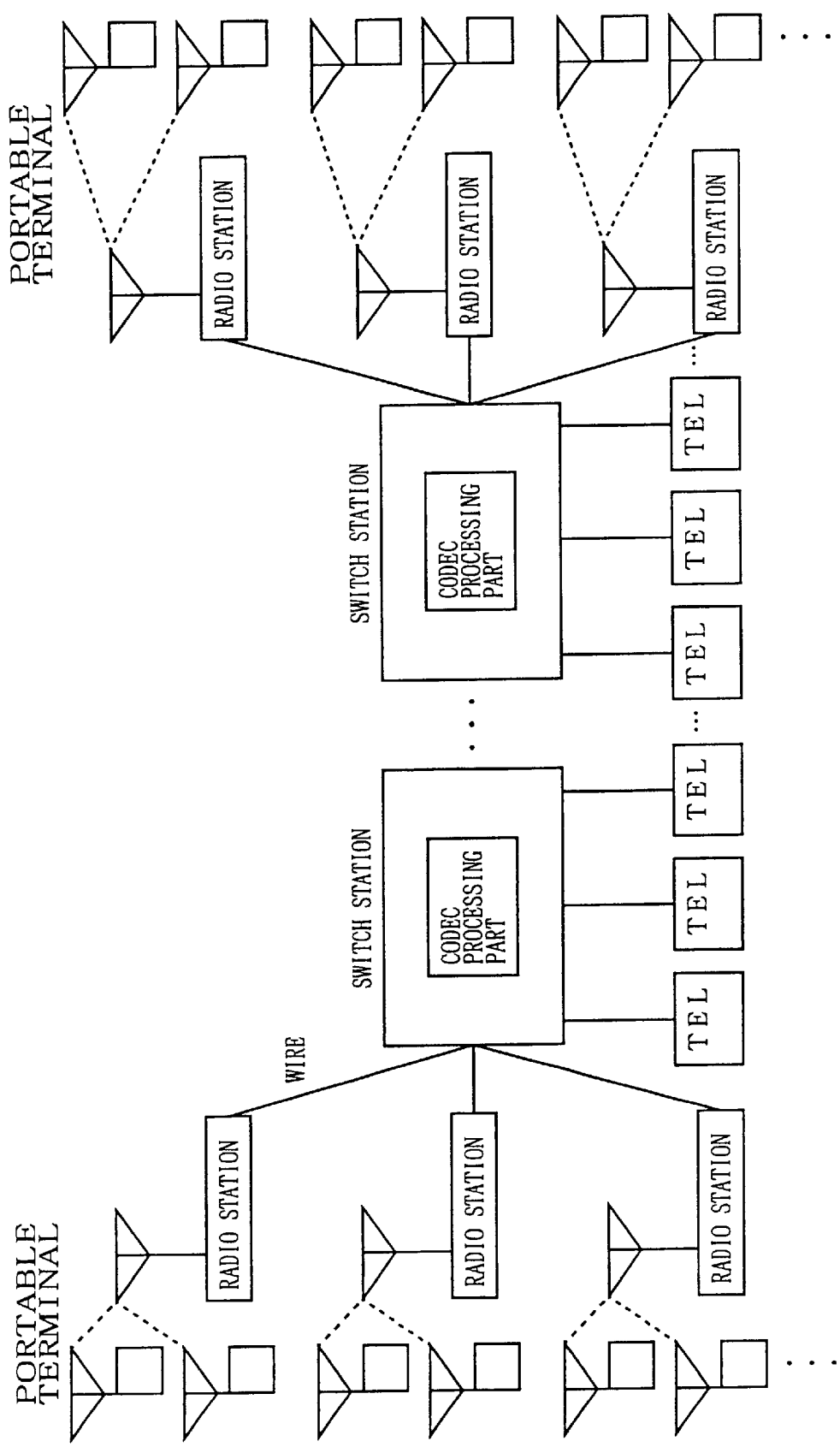
FIG. 1 is a block diagram of a mobile telecommunication system.
Figure 2:
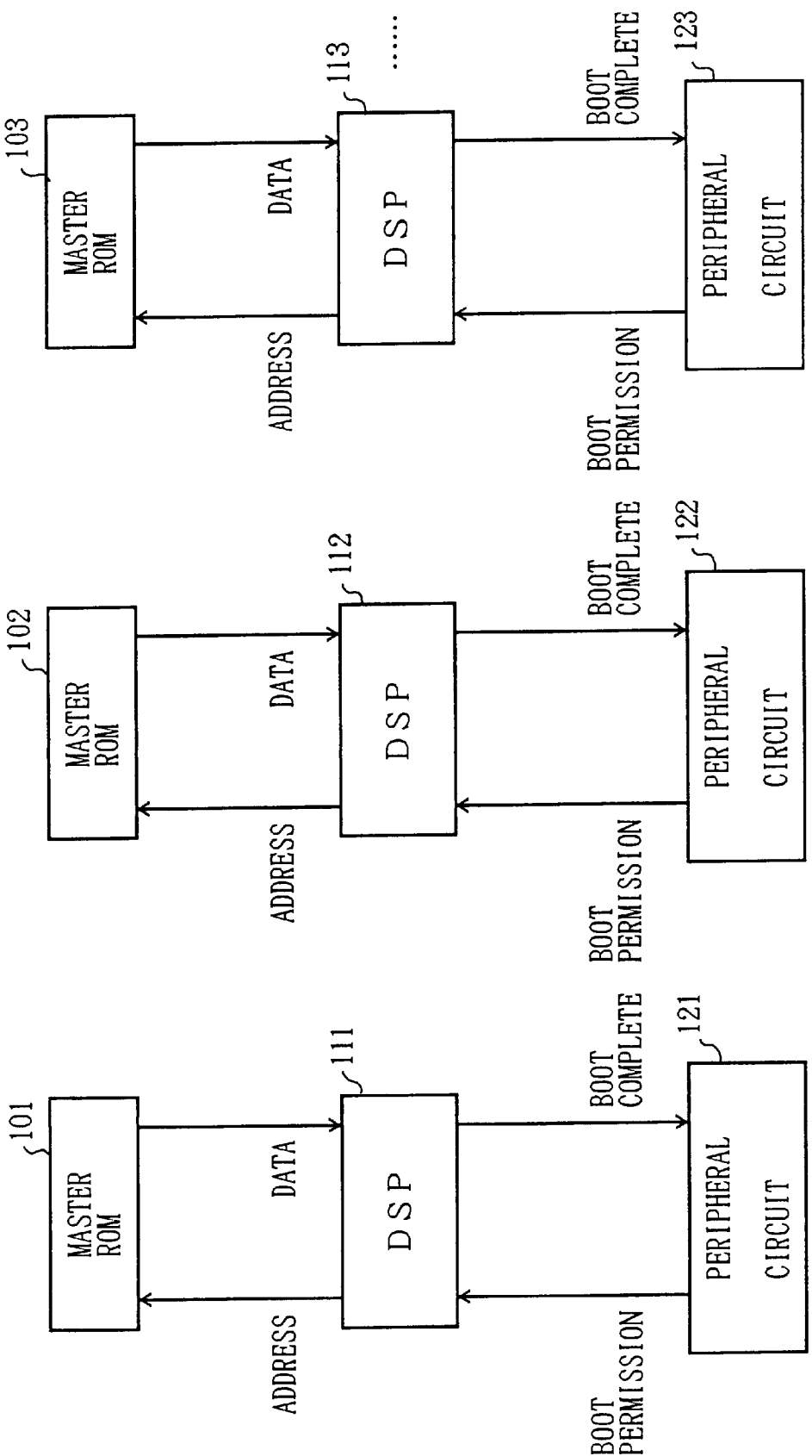
FIG. 2 is a block diagram of a codec processing part shown in FIG. 1.

Although the peripheral circuits shown in FIG. 1 are respectively connected to the DSPs 111, 112 and 113, these circuits are omitted from FIG. 3 for the sake of simplicity.

Figure 4:
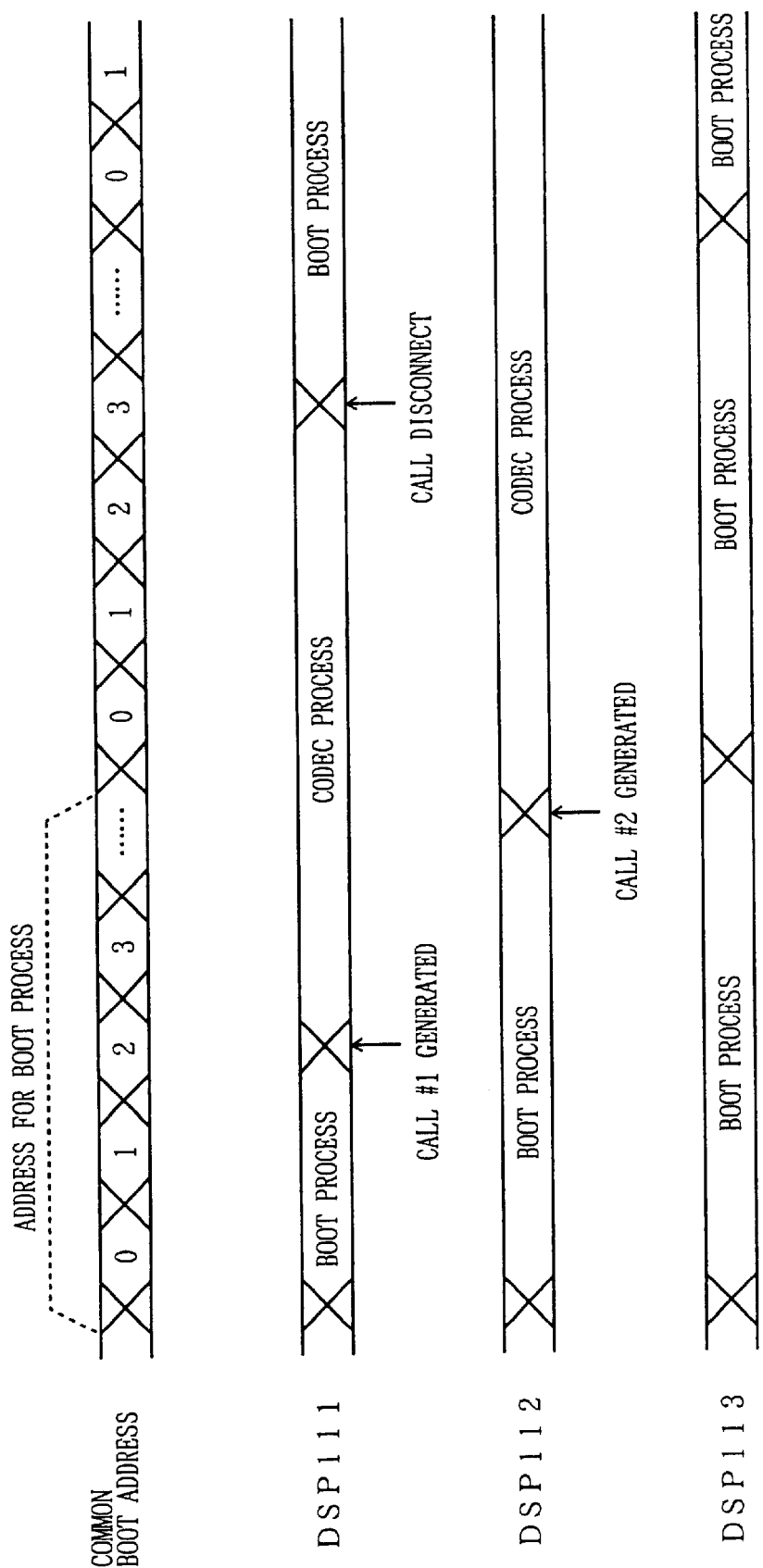
FIG. 4 is a timing chart of an operation of the first embodiment of the present invention shown in FIG. 3.

A description will now be given, with reference to FIG. 4, of an operation of the device shown in FIG. 3. In the following, it is assumed that the device shown in FIG. 3 is provided in the codec processing part of each of the switch stations shown in FIG. 1.

The operation of the device will be outlined. When only one of the DSPs 111, 112 and 113 is informed of receipt of a call, the DSP immediately stops the boot process and performs the codec process, while the other DSPs continue to repeatedly perform the boot process.

First, the boot process will be described. The controller 200 supplies the write enable signals to the instruction memories 131, 132 and 133, and supplies the address generator 220 with an instruction for generating the address. Upon receipt of the above instruction, the address generator 220 sequentially generates the address so that it changes such as 0x0000→, 0x0001→0x0002, . . . The address thus generated is supplied to the selectors 141, 142 and 143, and is supplied to the master ROM 230. Data stored in the area of the master ROM 230 specified by the above address is read therefrom and is written into the instruction memories 131, 132 and 133. When the address generator 220 generates the last address, the writing of the necessary download information into the instruction memories 131, 132 and 133 is completed. The controller 200 is informed that the last address is issued by the address generator 220, and then generates the boot permission signals to the DSPs 111, 112 and 113. Then, the DSPs 111, 112 and 113 read the download information stored in the instruction memories 131, 132 and 133 and store the read download information therein. When the DSPs 111, 112 and 113 have received all the download information from the instruction memories 131, 132 and 133, respectively, the DSPs 111, 112 and 113 sends the boot complete signals to the controller 200. A series of steps as described above forms the boot process.

The following situation will now be assumed. All the DSPs 111, 112 and 113 have no call requests and continue to repeatedly perform the boot process. The boot process has been executed more than one time. The DSP 111 receives a call request while it is performing the boot process. The above call request is indicated by #1 in FIG. 4. The controller 200 causes the DSP 111 to terminate the boot process, and writes data into the built-in memory 210, the above data indicating that a connection for the requested call is made in the channel processed by the DSP 111. Then, the DSP 111 starts the codec process by, for example, disabling the boot permission signal to the DSP 111. When the call is disconnected, the controller 200 outputs the boot permission signal to the DSP 111, which restarts the boot process.

In the prior art, a reset signal is generated in response to one call request, and the boot process is carried out only one time. In this case, no problem will occur if the DSP frequently handles calls, because the next call will occur shortly after the call being processed is terminated. In this case, the DSP has a relatively high reliability. However, if it takes a relatively long time to receive the next call after the previous call is terminated, the downloaded program and data in the DSP may be damaged because the boot process is not performed until the next call is received. Hence, the reliability of the DSP is low. Further, since the boot process is started upon receipt of a call, it takes a certain time to make a connection for the call.

In contrast, the above-mentioned first embodiment of the present invention continues to repeatedly perform the boot process for each of the DSPs 111, 112 and 113 until a call is received. Further, the boot process is restarted immediately after the call is disconnected. Hence, the reliability of the contents of the instruction memories 131, 132 and 133 is extremely high, and a connection for the call request can be rapidly made and released.

A description will now be given of a second embodiment of the present invention. The hardware structure of the second embodiment of the present invention is the same as that shown in FIG. 3. The boot process of the second embodiment of the present invention is the same as that employed in the first embodiment thereof, and a description thereof will thus be omitted here.

As described above, the DSPs which do not receive calls continue to repeatedly perform the boot process until a call is received. According to the second embodiment of the present invention, all the DSPs (for example, mounted on a circuit board) are assigned respective identification numbers (hereinafter referred to as DSP numbers). The controller 200 sequentially selects the DSP numbers one by one at intervals sufficient to complete the boot process, and sends the boot permission signal to the selected DSP. Then, the boot process for the selected DSP is carried out during the period (equal to the intervals).

Figure 5:
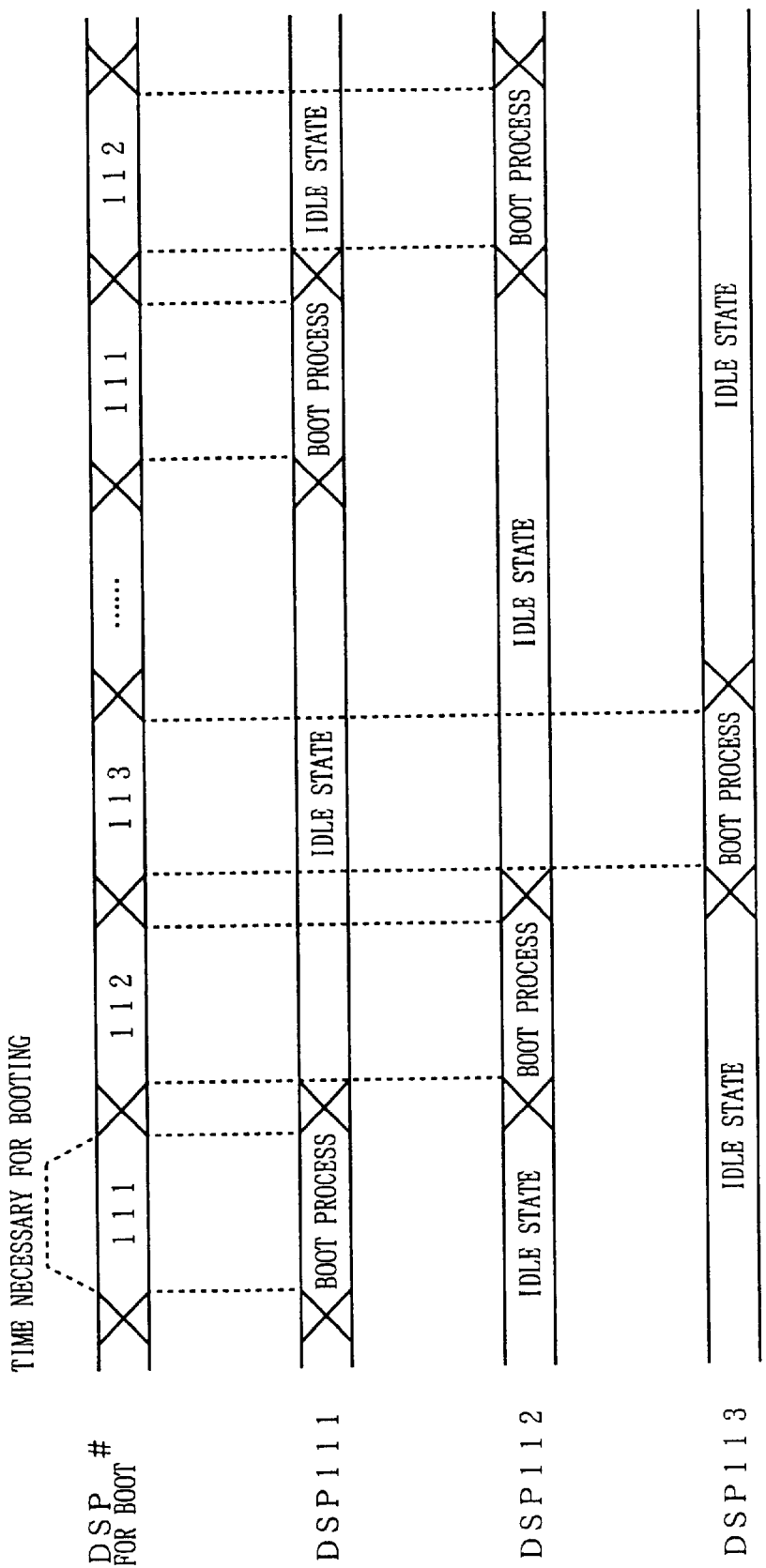
FIG. 5 is a timing chart of an operation of a second embodiment of the present invention.

As shown in FIG. 5, the controller 200 sequentially specifies one of the DSP numbers of the DSPs 111, 112 and 113 for the given period sufficient to complete the boot process. In FIG. 5, the same reference numbers of the DSP numbers 111, 112 and 113 are used as the DSP numbers. In FIG. 5, the DSP numbers "111", "112", "113", . . . are repeatedly specified one by one by the controller 200. When the controller 200 specifies the DSP number "111", the corresponding DSP 111 is subjected to the boot process, while the other DSPs 112 and 113 are in the idle state. When the boot process for the DSP 111 is completed, the DSP 111 is switched to the idle state, and the DSP 112 is then subjected to the boot process. In this manner, each of the DSPs 111, 112 and 113 is periodically subjected to the boot process.

Figure 6:
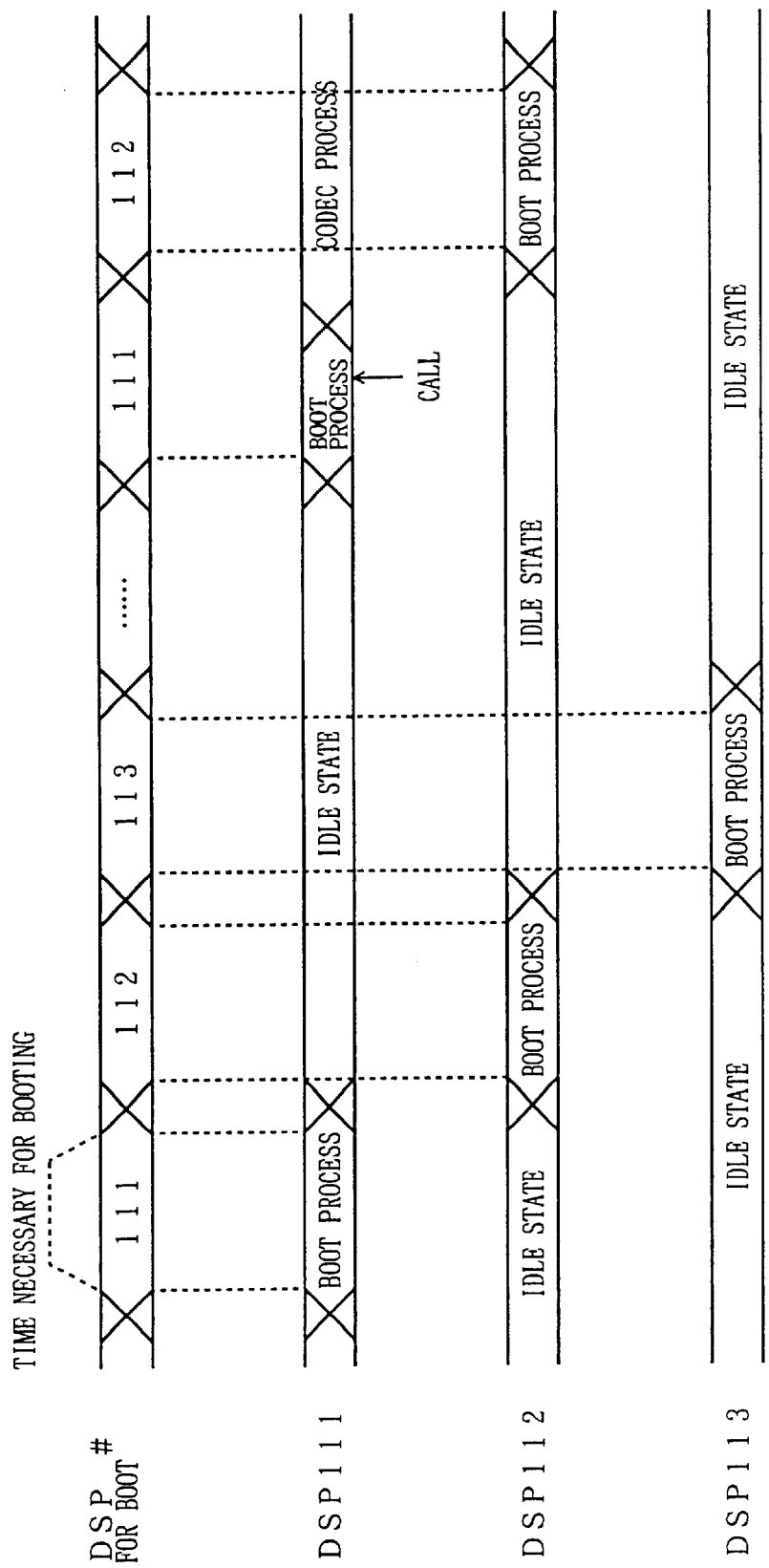
FIG. 6 is a timing chart of an operation of the second embodiment of the present invention.

As shown in FIG. 6, if a call is generated while the boot process for the DSP 111 is being executed, the controller 200 immediately stops the boot process, and makes a connection for the call. The controller 200 starts the codec process, so that the call can be immediately processed.

The above-mentioned second embodiment of the present invention has not only a reliability higher than that of the prior art but also a reduced amount of power necessary for the boot process.

Figure 7:
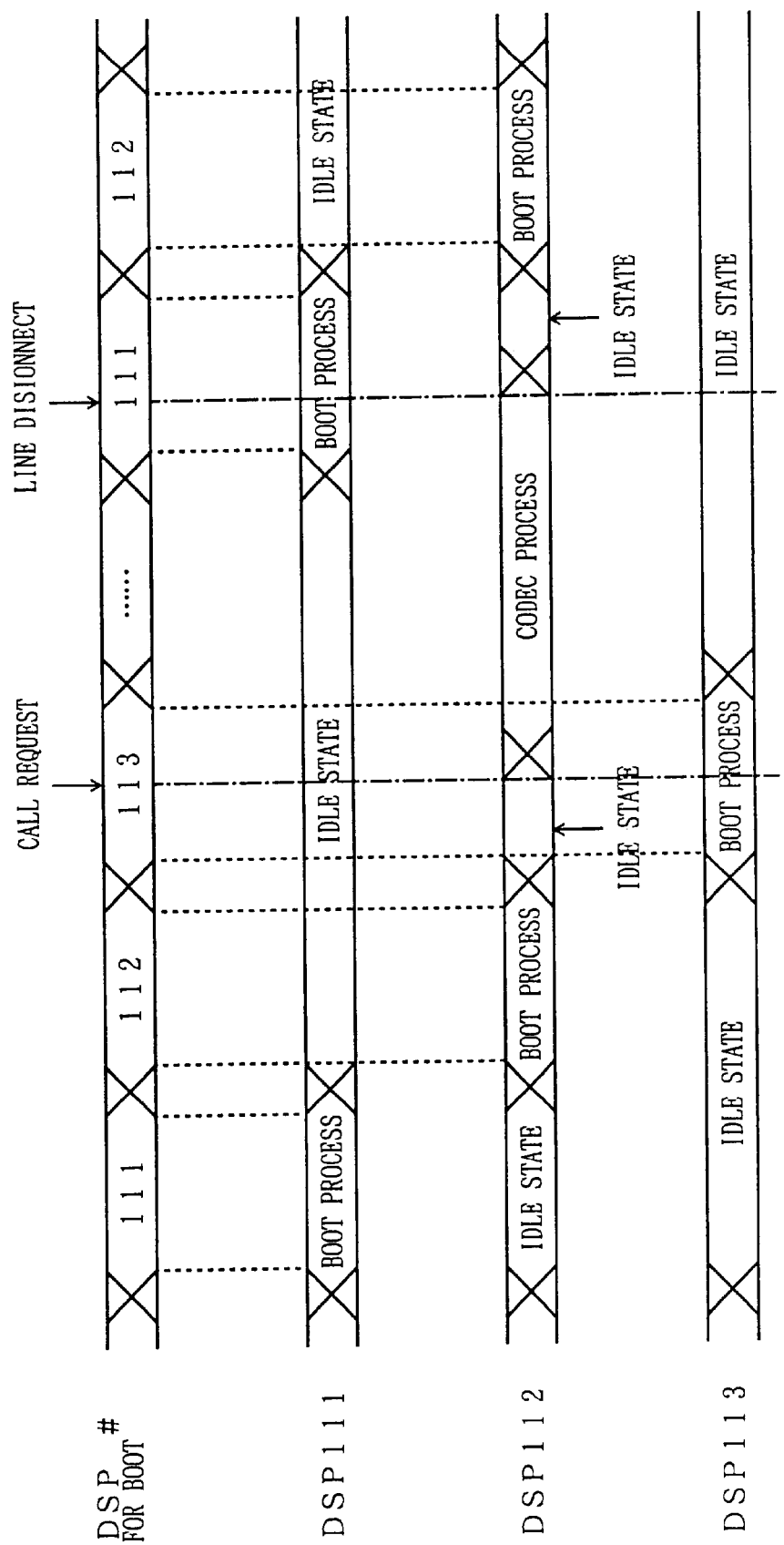
FIG. 7 is a timing chart of an operation of a third embodiment of the present invention.

A description will now be given, with reference to FIG. 7, of a third embodiment of the present invention. The hardware structure of the third embodiment of the present invention is the same as that of the first embodiment thereof. The boot process employed in the third embodiment of the present invention is the same as that employed in the first embodiment thereof, and thus a description thereof will be omitted here.

As described above, the second embodiment of the present invention subjects the DSPs 111, 112 and 113 to the boot process one by one under the control of the controller 200 using the DSP numbers. The third embodiment of the present invention is arranged so that the controller 200 receives a call and identifies the DSP for which the boot process has been most recently completed before the call is received. Then, the controller 200 controls the identified DSP to execute the codec process for the received call. In the case shown in FIG. 7, a call occurs when the download information is being downloaded to the DSP 113. The boot process for the DSP 112 was completed just before the boot process for the DSP 113 is started. The controller 200 controls the DSP 112 to execute the codec process for the received call. There are several ways to identify the DSP for which the boot process has been most recently completed. For example, the controller 200 checks the DSP number of the DSP which is being subjected to the boot process when the call is received. Alternatively, the controller 200 checks the boot complete signals from the DSPs.

The third embodiment of the present invention has an advantage in which a reduced amount of power is consumed because the boot process is not concurrently carried out for all the DSPs 111, 112 and 113. Further, the controller 200 causes the identified DSP for which the boot process has been completed just before receipt of a call to process the call. Hence, there is a very low possibility that the corresponding instruction memory may be damaged due to electrical noise or the like. In this regard, the third embodiment of the present invention has a possibility higher than that of the second embodiment thereof.

A description will now be given, with reference to FIGS. 8A, 8B, 9A and 9B, of a fourth embodiment of the present invention. The hardware structure of the fourth embodiment of the present invention is the same as shown in FIG. 3. The boot process employed in the fourth embodiment is the same as that employed in the first embodiment, and a description thereof will thus be omitted here.

The first embodiment of the present invention, in which the boot process for the DSPs is repeatedly performed until a call is received, is superior to the other embodiments in terms of the stability (reliability) of the instruction memories 131, 132 and 133. However, the first embodiment of the present invention consumes a larger amount of power.

According to the fourth embodiment of the present invention, a given timing is referred to and the boot process is executed based on the given timing. For example, a frame signal can be used as the given timing to be referred to. The frame signal is supplied from the peripheral circuits like those shown in FIG. 1 to the controller 200 and includes information indicating the bit rate of encoding and decoding. The frame signal has a duration of time and is periodically supplied. By using the frame signal, it is possible to periodically perform the boot process for the DSPs without newly defining the timing for the boot process.

The frame signal supplied to the codec processing part has a so-called high (H) period and a low (L) period. If the shorter one of the H and L periods is sufficient to complete the boot process, the boot process is executed for the shorter period. if the shorter period is insufficient to complete the boot process, the boot process is carried out for the longer period.

FIG. 8A shows pattern #1, in which both the H period a and L period b of the frame signal are longer than the time c necessary to start and complete the boot process. In this case, the H period a is selected taking into power consumption. During the H period a, the boot process for the DSPs 111, 112 and 113 is carried out. The DSPs 111, 112 and 113 are in the idle state for the L period b. In this manner, the boot process for the DSPs 111, 112 and 113 is executed for each H period a.

In pattern #2 shown in FIG. 8B, the H period a is longer than the L period b, which is longer than the time c necessary for the boot process. Although the boot process can be executed during either the H period or L period, the L period is selected in terms of power consumption. During the H period, the DSPs 111, 112 and 113 are in the idle state. In this manner, the boot process for the DSPs 111, 112 and 113 is executed for each of the L periods.

In pattern #3 shown in FIG. 9A, the H period a of the frame signal is longer than the time c necessary for the boot process, while the L period b is shorter than the time c. Hence, the H period is selected and the boot process for the DSPs 111, 112 and 113 is carried out for each H period a. The DSPs 111, 112 and 113 are in the inactive state during each L period b.

In pattern #4 shown in FIG. 9B, the H period a of the frame signal is shorter than the time c, while the L period b thereof is longer than the time c. Hence, the L period is selected and the boot process for the DSPs 111, 112 and 113 is carried out for each L period b. The DSPs 111, 112 and 113 are in the inactive state during each H period a.

A description will now be given, with reference to FIGS. 10 and 11, of a fifth embodiment of the present invention.

Figure 10:
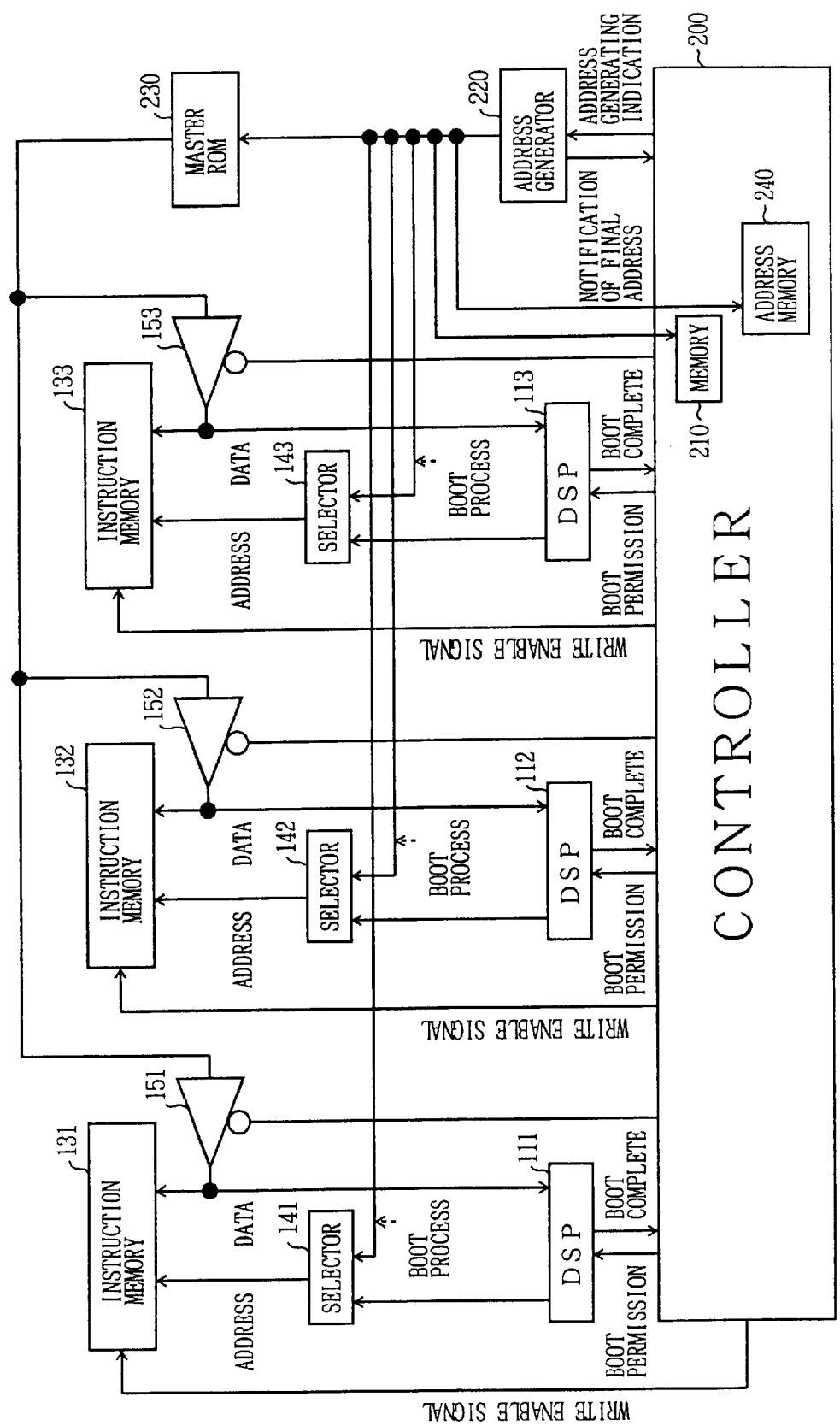
FIG. 10 is a block diagram of a structure of a fifth embodiment of the present invention.
Figure 11:
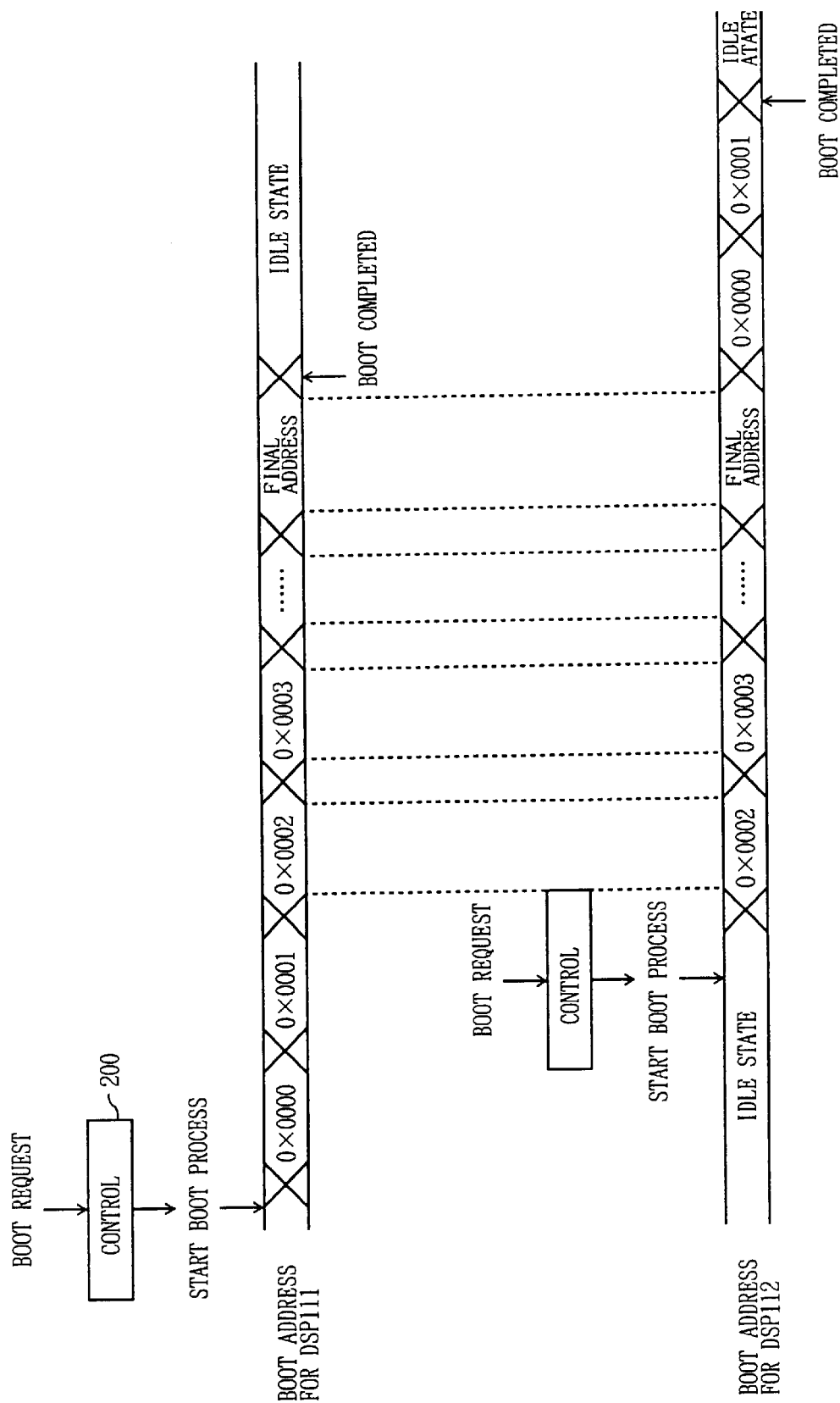
FIG. 11 is a timing chart of an operation of the fifth embodiment of the present invention.

FIG. 10 is a block diagram of a device according to the fifth embodiment of the present invention. In FIG. 10, parts that are the same as those shown in FIG. 3 are given the same reference numbers. The structure shown in FIG. 10 is the same as that shown in FIG. 3 except that the controller 200 shown in FIG. 10 has an address memory 240 in order to realize the following operation. The boot process itself in the device shown in FIG. 10 is the same as that for the device shown in FIG. 3.

It will now be assumed that the boot process for the DSP 111 is being carried out while the boot address generated by the address generator 220 changes such as 0x0000→0x0001→0x0002 . . . The exchange station having the codec processing part having the structure shown in FIG. 10 receives a call for another channel related to the DSP 112. The controller 200 causes the DSP112 to start the boot process. The value of the boot address for the DSP 111 obtained when the boot process for the DSP 112 is started is used as the initial value of the boot address for the DSP 112. In FIG. 9, the address "0x0002" is used as the initial value of the boot address for the DSP 112. Hence, the boot processes for the DSP 111 and the DSP 112 are simultaneously executed by using the same address value. The above initial value of the boot address for the DSPs 112 is stored in the address memory 240 of the controller 200. At the same time as the boot process for the DSP 111 is completed, the initial address value is read from the address memory 240, and the boot process for the DSP 112 continues until the initial address value is processed. In FIG. 11, the boot process for the DSP 112 is completed when the initial address value "0x0002" is processed.

According to the above fifth embodiment of the present invention, it is possible to efficiently perform the boot processes for boot requests based on calls.

Figure 12:
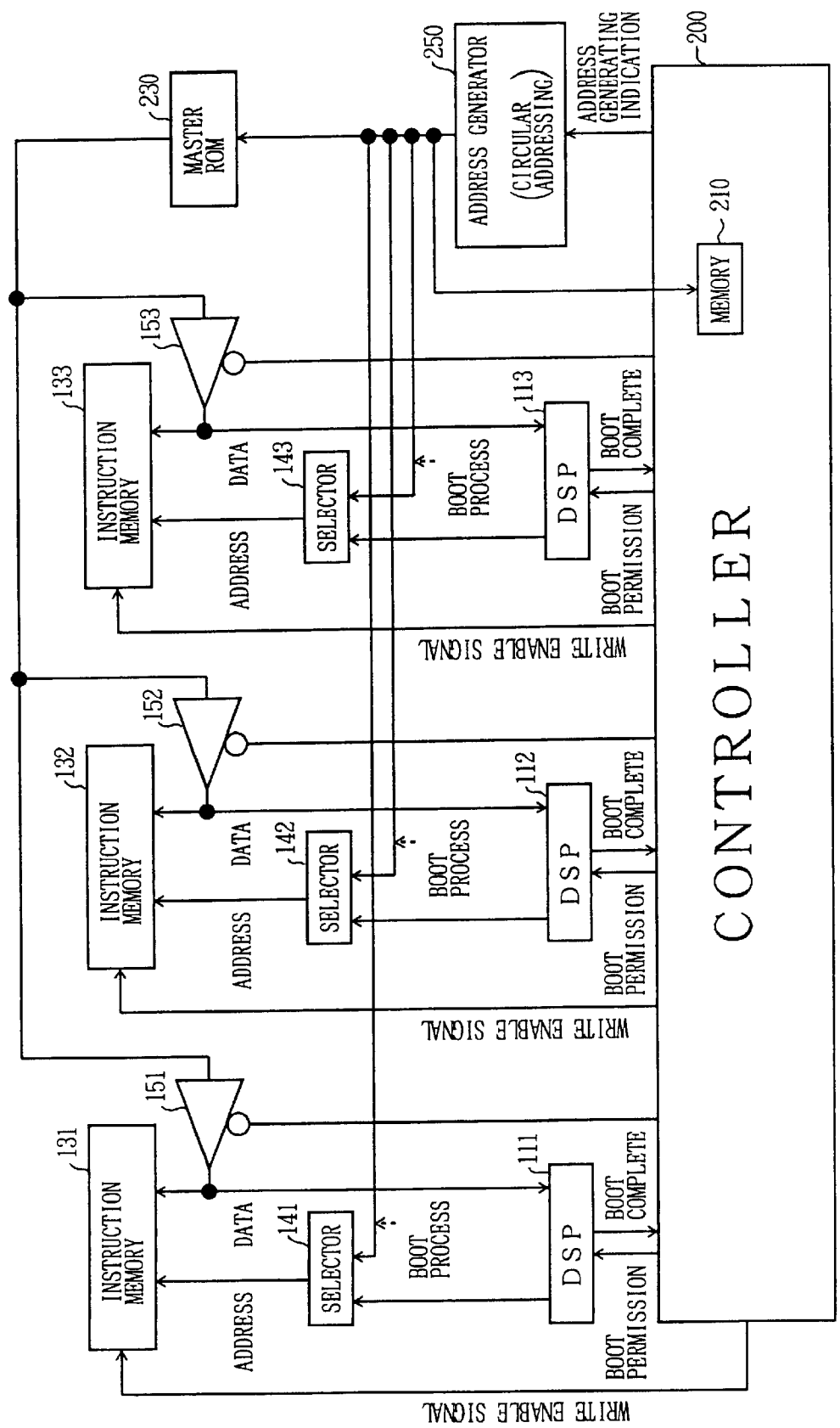
FIG. 12 is a block diagram of a structure of a sixth embodiment of the present invention.
Figure 13:
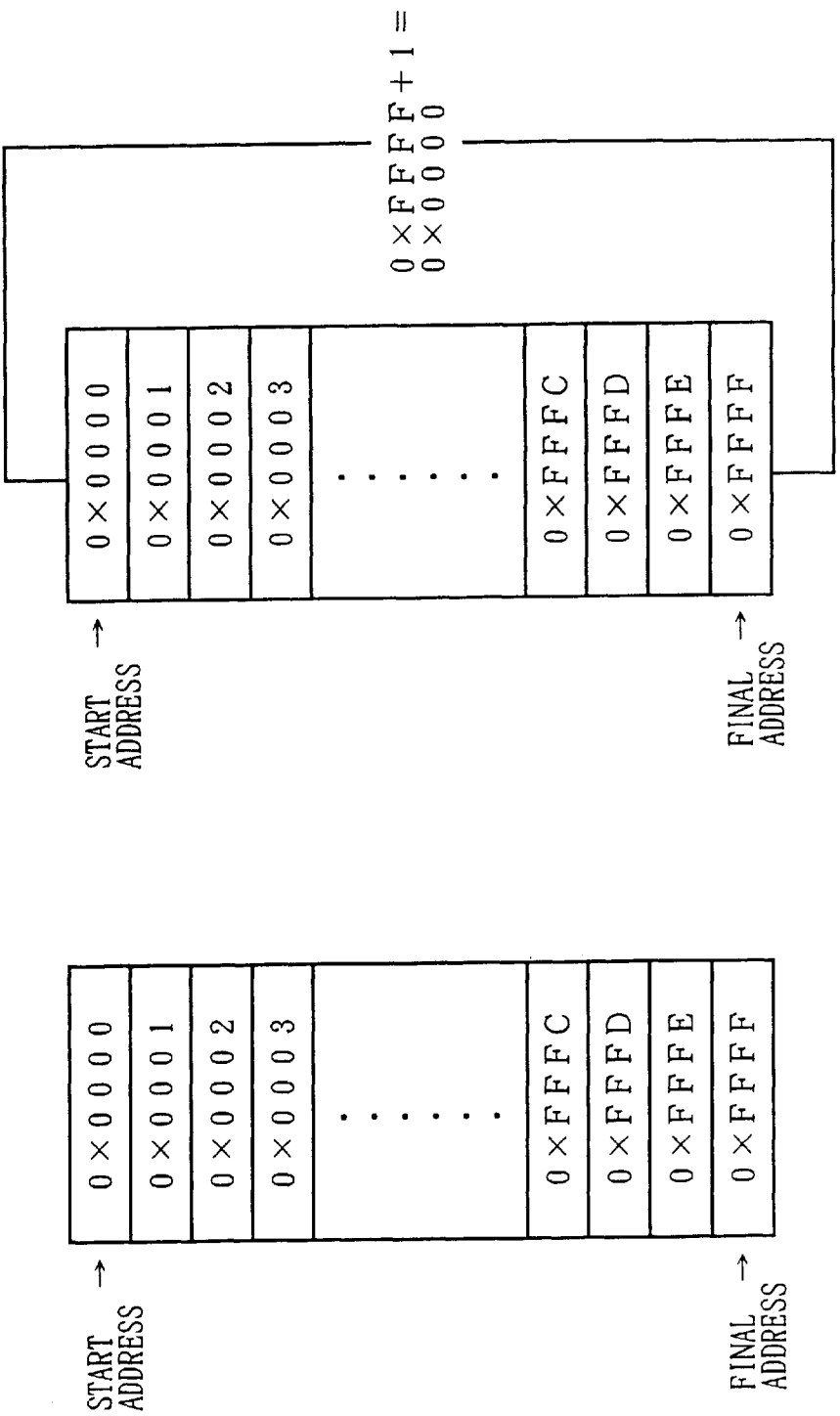
FIG. 13 is a diagram explaining an operation of the sixth embodiment of the present invention.

A description will now be given, with reference to FIGS. 12 and 13, of a sixth embodiment of the present invention. In FIG. 12, parts that are the same as those shown in FIG. 3 are given the same reference numbers. The structure shown in FIG. 12 differs from that shown in FIG. 3 in that the structure shown in FIG. 12 employs an address generator 250 which generates the address in a circular addressing formation. The boot process in the sixth embodiment of the present invention is the same as that in the first embodiment thereof.

The fifth embodiment of the present invention uses the address memory 240, while the sixth embodiment thereof does not need any register or memory for storing the address.

Generally, the program which implements the boot process has a fixed length or size. Hence, the circular addressing as shown in FIG. 13 can be employed to read the program. The address generator 250 counts the last address "0xFFFF" and returns to the start (initial) address "0x0000", as shown in FIG. 13. That is, the last address "0xFFFF" and the start address "0x0000" are virtually chained.

It will now be assumed that the boot process for the DSP 111 is being carried out while the boot address generated by the address generator 250 changes such as 0x0000→0x0001→0x0002 . . . The exchange station having the codec processing part having the structure shown in FIG. 10 receives a call for another channel related to the DSP 112.

The controller 200 causes the DSP112 to start the boot process. The value of the boot address for the DSP 111 obtained when the boot process for the DSP 112 is started is used as the initial value of the boot address for the DSP 112. When the boot process for the DSP 111 is completed, the boot process for the DSP 112 is not completed. Since the address generator 250 generates the boot address circularly, the boot process for the DSP 112 can continue until the address "0x0002" is generated by the address generator 250.

A description will now be given, with reference to FIGS. 14 and 15, of a seventh embodiment of the present invention. The hardware structure of the seventh embodiment of the present invention is the same as that shown in FIG. 3. The boot process employed in the seventh embodiment of the present invention is the same as that employed in the first embodiment of the present invention.

Figure 14:
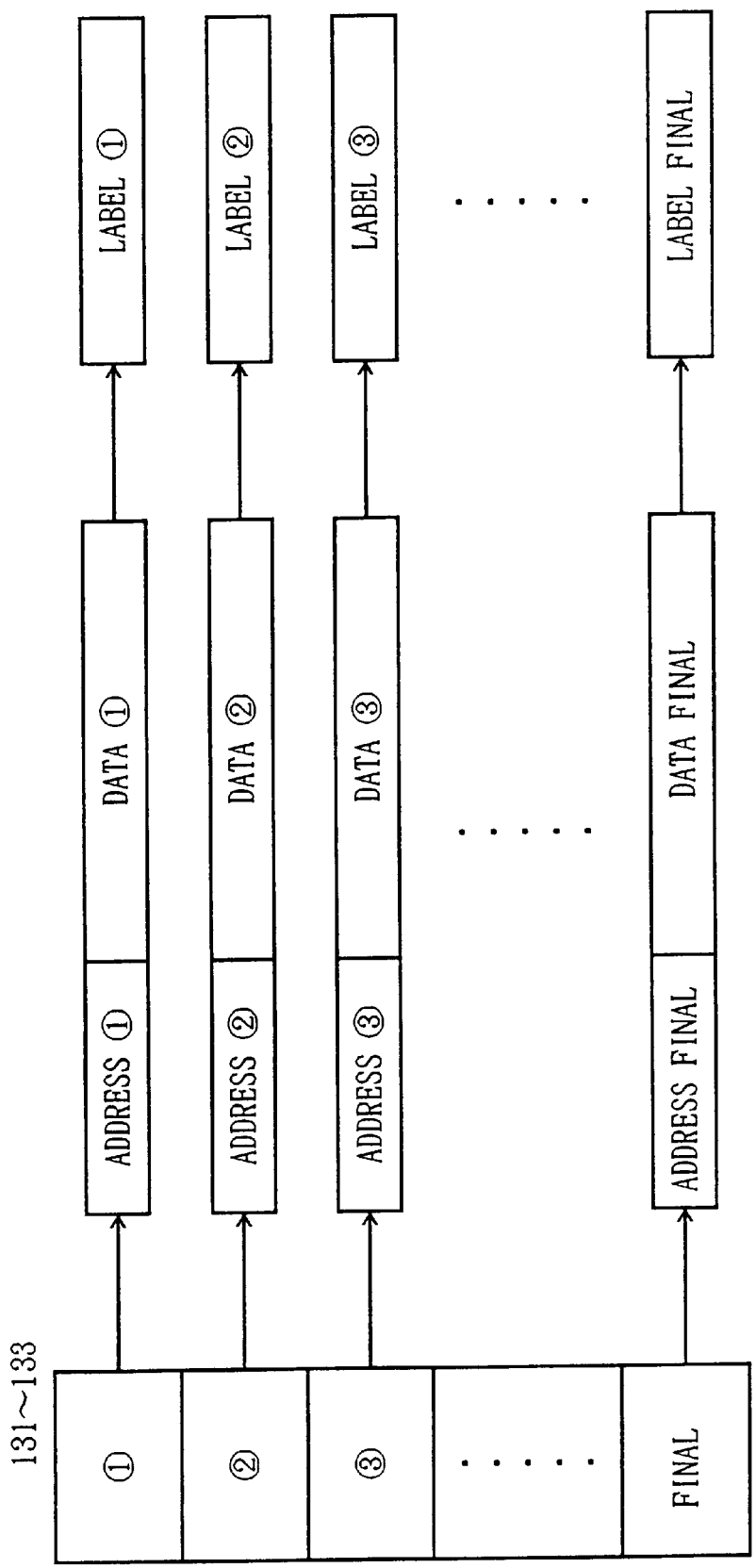
FIG. 14 is a diagram explaining an operation of a seventh embodiment of the present invention.

As shown in FIG. 14, the memory area of each of the instruction memories 131–133 is segmented into sections to which labels are respectively assigned. In other words, the download information contains pieces of data to which labels are assigned, and the addresses indicating the sections are also assigned the same labels as those assigned to the data.

Figure 15:
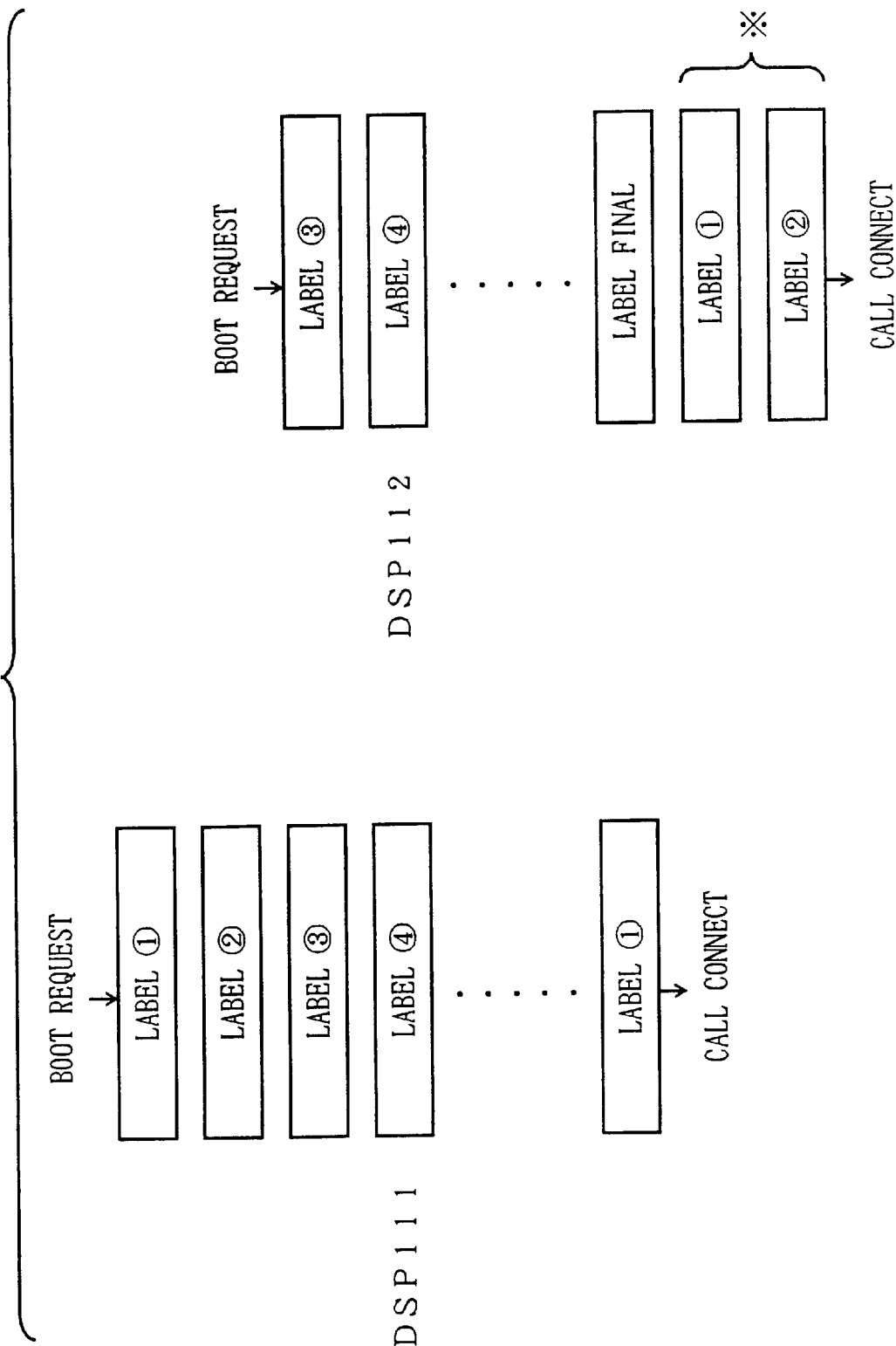
FIG. 15 is another diagram explaining the operation of the seventh embodiment of the present invention.

Referring to FIG. 15, when label #3 is handled in the boot process for the DSP 111, the boot process for the DSP 112 is started from label #3. The boot processes for the DSPs 111 and 112 are simultaneously carried out. Even after the boot process for the DSP 111 is completed, the boot process for the DSP 112 is continued until label #2 is processed as indicated by symbol * in FIG. 15.

A description will now be given, with reference to FIG. 16, of an eighth embodiment of the present invention. The hardware structure of the eighth embodiment of the present invention is the same as that shown in FIG. 3. The boot process employed in the eighth embodiment of the present invention is the same as that employed in the first embodiment of the present invention. In order to facilitate understanding of the eighth embodiment of present invention, DSPs 114 and 115 are provided in addition to the DSPs 111–113.

As in the case of the seventh embodiment of the present invention, each of the instruction memories 131–133 is segmented into sections to which labels are respectively assigned according to the eighth embodiment thereof.

Figure 16:
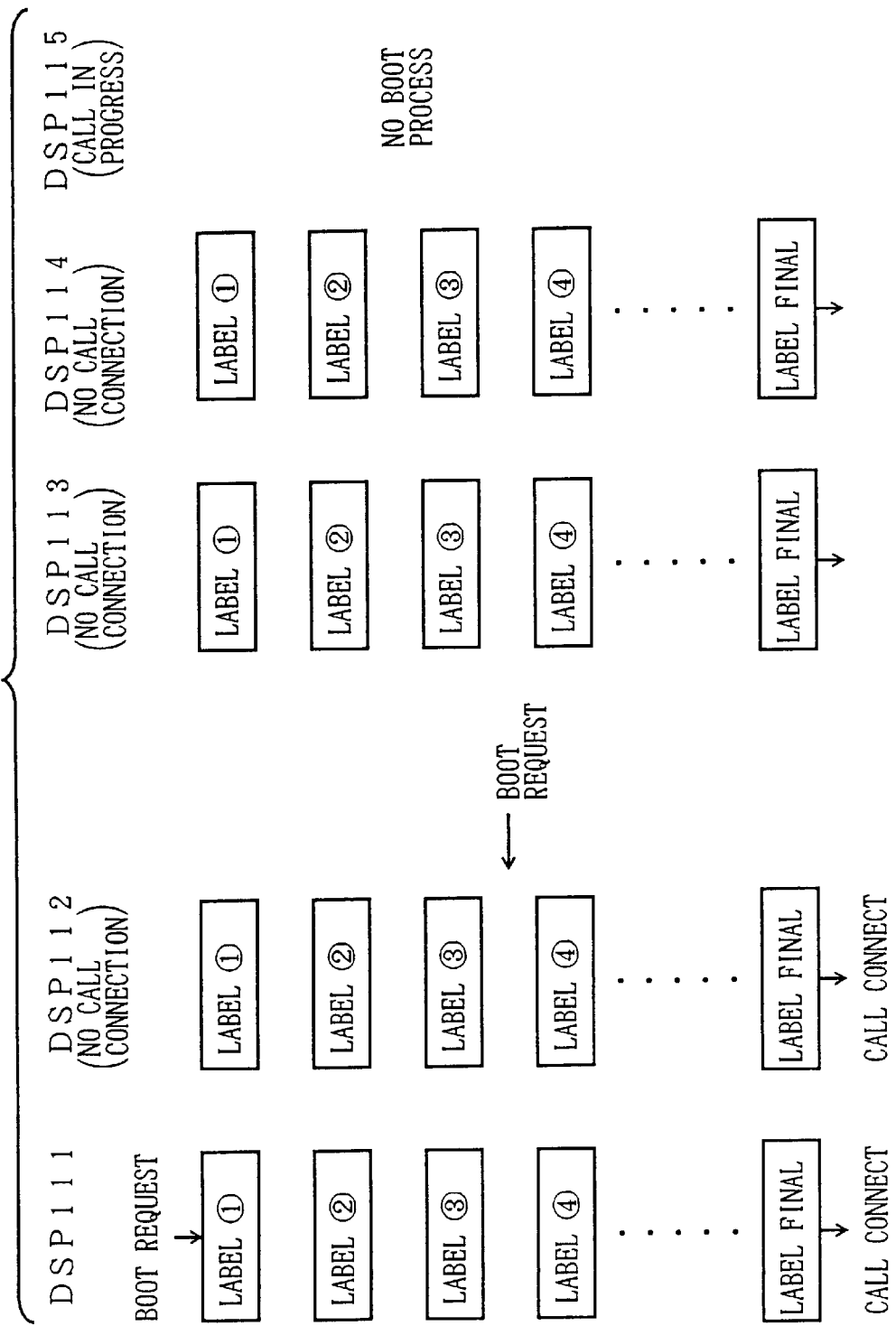
FIG. 16 is a diagram showing an operation of an eighth embodiment of the present invention.

Referring to FIG. 16, it will now be assumed that the boot process for the DSP 111 is started in response to the boot request addressed thereto. Simultaneously, the boot processes for the other DSPs 112–114 which do not handle calls are started. The boot process for the DSP 115 which is processing the codec process is executed. That is, when a call for one of the DSPs which do not process any calls is received, the boot processes for all DSPs except for a DSP which is processing the codec process are simultaneously started.

When a call for the DSP 112 is requested as shown in FIG. 16, a connection for the call is made and the codec process is carried out after the boot process for the DSP 112 is completed.

According to the eighth embodiment of the present invention, the boot processes for all DSPs except for a DSP which is executing the codec process are not executed until a call for any of the DSPs is requested. Hence, the eighth embodiment of the present invention consumes a smaller amount of power than the first embodiment thereof. Further, as compared with the seventh embodiment of the present invention, it is possible to reduce the time necessary for the boot process by an amount equal to the labels indicated by the label * in FIG. 15 and to thus make a connection rapidly.

Figure 17:
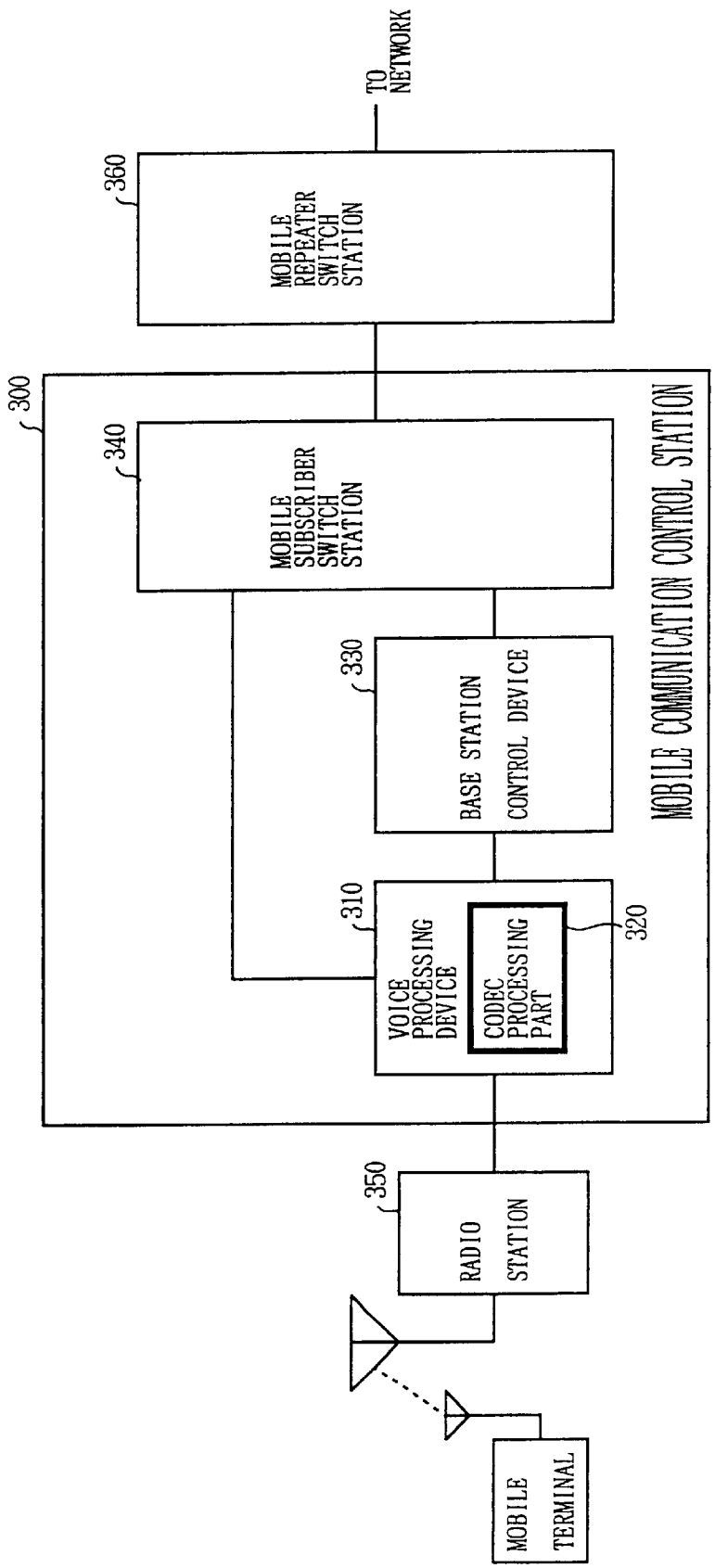
FIG. 17 is a block diagram of a switch system having the device of the present invention.

A description will now be given, with reference to FIG. 17, of a switch system using the codec processing part configured as described above. A mobile communication control station 300 includes a voice processing device 310, a base station control device 330 and a mobile subscriber switch station 340. The voice processing device 310 has a codec processing part 320. The voice processing device 310 is connected to a radio station 350. In practice, a plurality of radio stations are connected to codec processing parts 320 provided in the voice processing device 310. The codec processing part 320 includes a device having a plurality of DSPs as configured according to the first through eighth embodiments of the present invention. That is, DSPs and instruction memories are provided for the respective channels, and the master ROM 230, the address generator 220 or 250, and the controller 200 are commonly provided. The device of the present invention can be applied to switch systems configured in other formations.

The present invention is not limited to the above-mentioned embodiments. For example, an arbitrary number of DSPs can be used. The address generator 220 generates the address commonly used to the master ROM 230 and the instruction memories 131–133. Alternatively, it is possible to supply different addresses to the master ROM 230 and the instruction memories 131–133. For example, a first address is supplied to the master ROM 230, and a second address is supplied to the instruction memories 131–133. In this case, two address generators are required. It is desirable that the two addresses have a correlation in order to synchronize the two addresses with each other. The device having DSPs of the present invention can be applied to not only the speech codec and the switch system but also devices processing signals and information processing systems.

The present invention is not limited to the specifically disclosed embodiments, and variations and modifications may be made without departing from the scope of the present invention.

What is claimed is:

1. A device comprising:

a plurality of DSPs;

a plurality of instruction memories respectively provided to said plurality of DSPs;

a master memory, connected coupled to said plurality of instruction memories and storing download information which is to be written into said plurality of instruction memories;

an address generator generating addresses of said instruction memories and said master memory; and selectors respectively coupled to the plurality of DSPs, each of the selectors selecting an address issued by a corresponding one of the plurality of DSPs and an address of a corresponding one of the instruction memories issued by the address generator.

2. The device as claimed in claim 1, wherein the DSPs which are in an idle state periodically receive the download information from the corresponding instruction memories.

3. The device as claimed in claim 1, wherein one of the DSPs which are in an idle state receives the download information from a corresponding one of the instruction memories at one time so that the DSPs which are in the idle state sequentially receive the download information at respective different timings.

4. The device as claimed in claim 1, wherein, when a process request occurs, one of the DSPs which has most recently received the download information accepts the process request.

5. The device as claimed in claim 1, wherein each of the DSPs receives the download information from a respective one of the instruction memories in accordance with a state of a given signal externally supplied to the device.

6. The device as claimed in claim 1, wherein:

when a first DSP which is one of the DSPs is receiving the download information from a first corresponding one of the instruction memories, a second DSP which is another one of the DSPs starts to receive the download information from a second corresponding one of the instruction memories in accordance with an address value identical to that for the first DSP; and when the first DSP receives all of the download information, the second DSP continues to receive the rest of the download information from said second corresponding one of the instruction memories.

7. The device as claimed in claim 6, wherein the address generator generates the addresses so that values of the addresses change circularly.

8. The device as claimed in claim 1, wherein:

the download information contains pieces of data respectively assigned labels;

when a first DSP which is one of the DSPs is receiving the download information from a first corresponding one of the instruction memories, a second DSP which is another one of the DSPs starts to receive the download information from a second corresponding one of the instruction memories so that the second DSP receives the piece of data of the download information having the same label as that assigned to the piece of data of the download information which the first DSP receives; and when the first DSP receives all of the download information, the second DSP continues to receive the rest of pieces of data forming the download information from said second corresponding one of the instruction memories.

9. The device as claimed in claim 1, wherein:

the download information contains pieces of data respectively assigned labels;

the DSPs which are in an idle state simultaneously start to receive the download information from the corresponding instruction memories so that the DSPs simultaneously receive pieces of data having the same label.

10. The device as claimed in claim 9, wherein one of the DSPs which are receiving the download information receives a process request, said one of the DSPs accepts the process request after all the pieces of data of the download information are received.

11. The device as claimed in claim 1, wherein the DSPs perform a voice encoding and decoding process.

12. A switch device having a function of a voice encoding and decoding process, said switch device comprising:

a plurality of DSPs;

a plurality of instruction memories respectively provided to said plurality of DSPs;

a master memory commonly coupled to said plurality of instruction memories and storing download information which is to be written into the instruction memories;

an address generator generating addresses of the instruction memories and said master memory; and selectors respectively coupled to the plurality of DSPs, each of the selectors selecting an address issued by a corresponding one of the plurality of DSPs and an address of a corresponding one of the instruction memories issued by the address generator.

* * * * *